Feb. 14, 1950 R. W. ARMSTRONG ET AL 2,497,429
MULTIPLE FILM HANGER WITH FILM TENSIONING MEANS
Filed Sept. 15, 1945 4 Sheets-Sheet 2
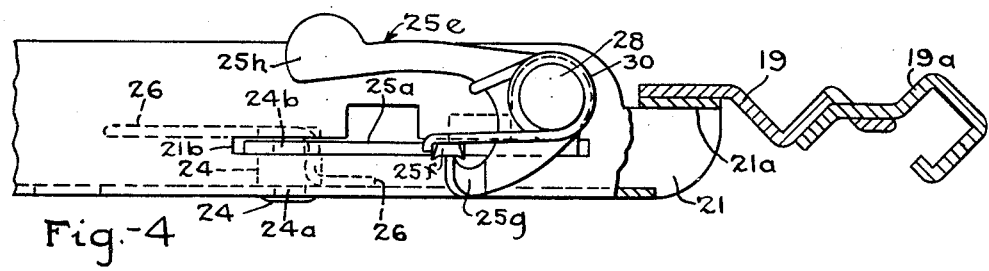
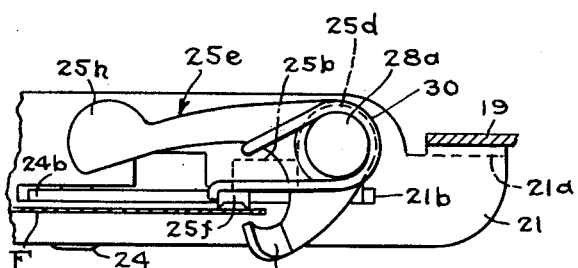
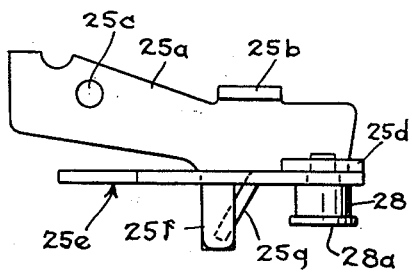
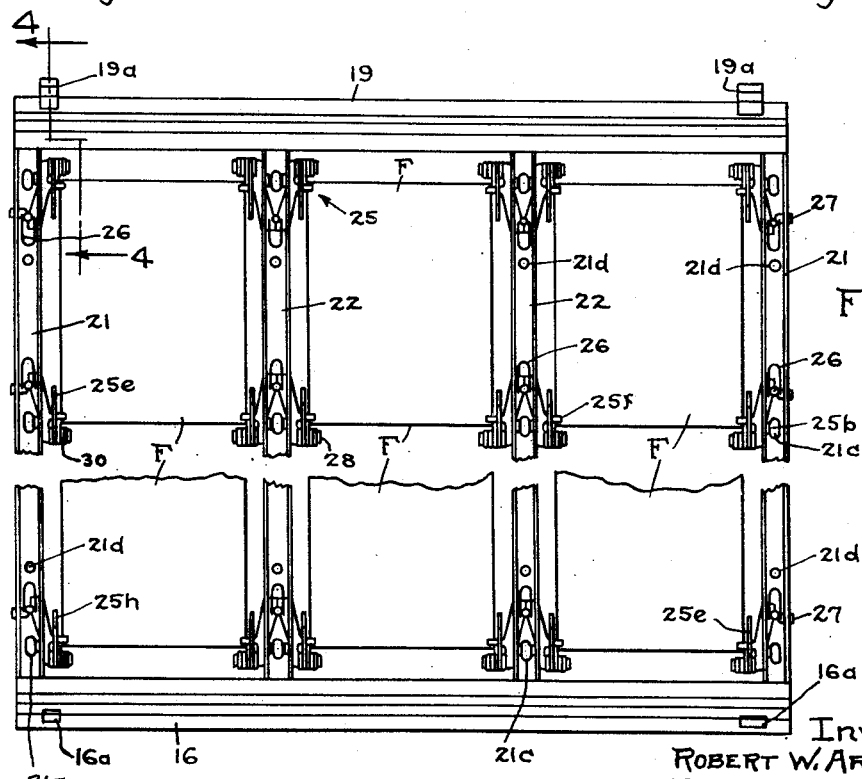
Inventors:
ROBERT W. ARMSTRONG
ROBERT SARDESON
EDWARD H. SAVELA
BY Chas. C. Reif
Attorney.

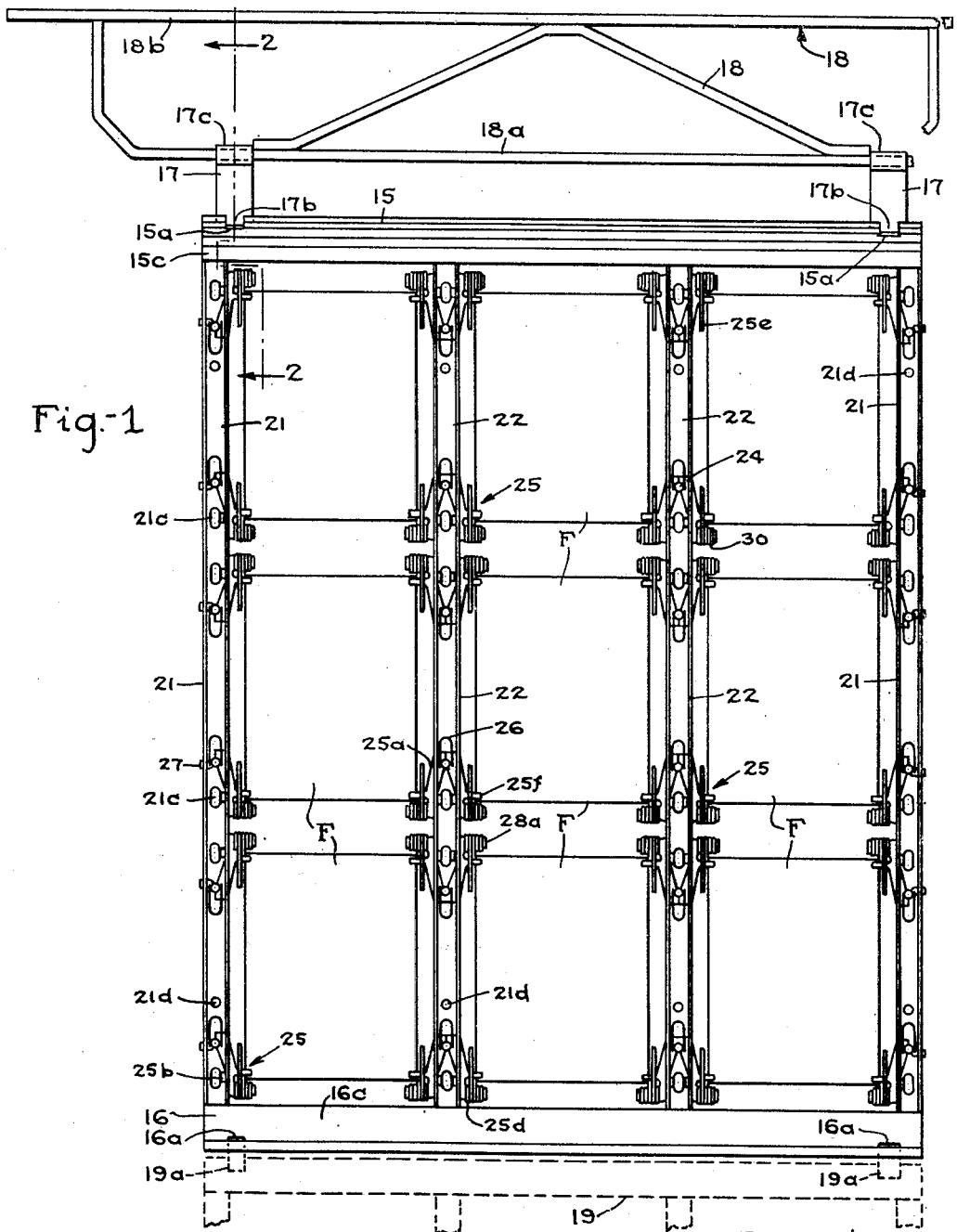

Feb. 14, 1950     R. W. ARMSTRONG ET AL     2,497,429
MULTIPLE FILM HANGER WITH FILM TENSIONING MEANS
Filed Sept. 15, 1945     4 Sheets-Sheet 3
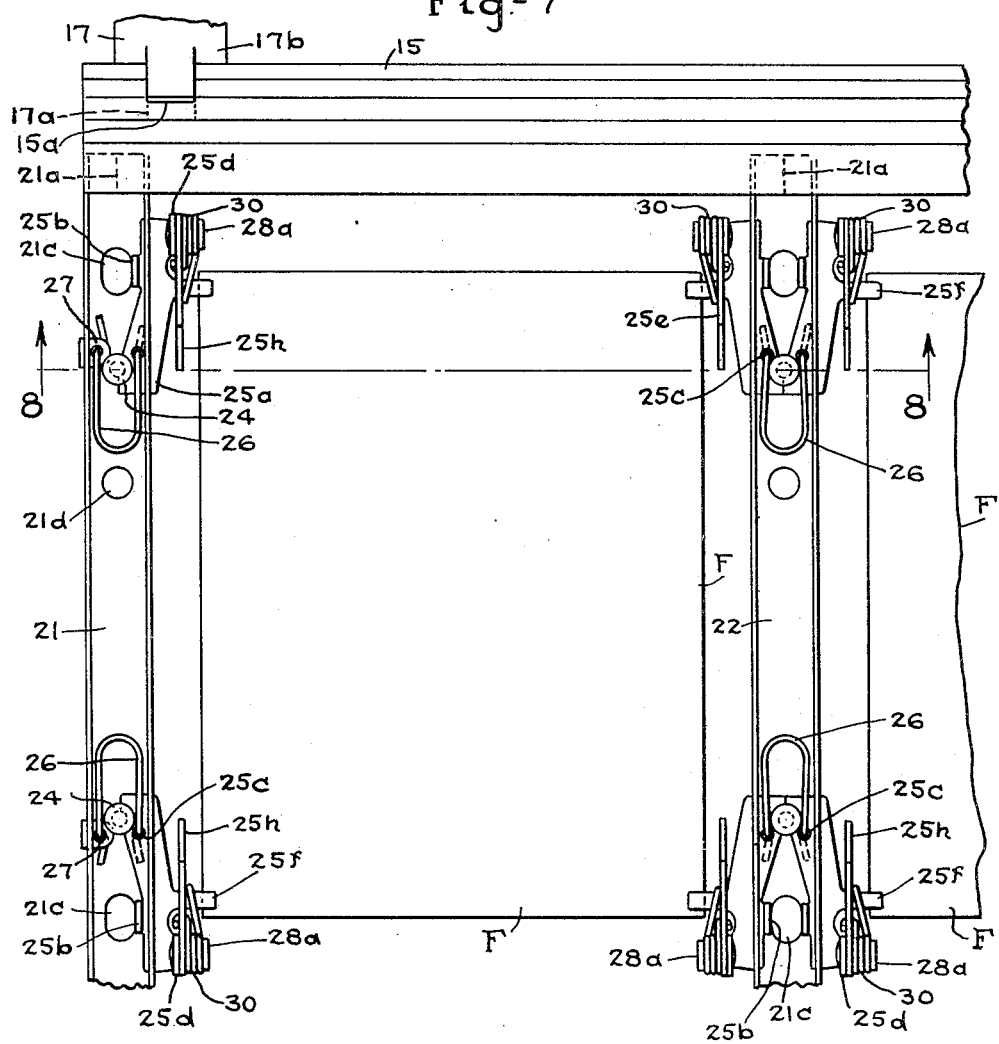
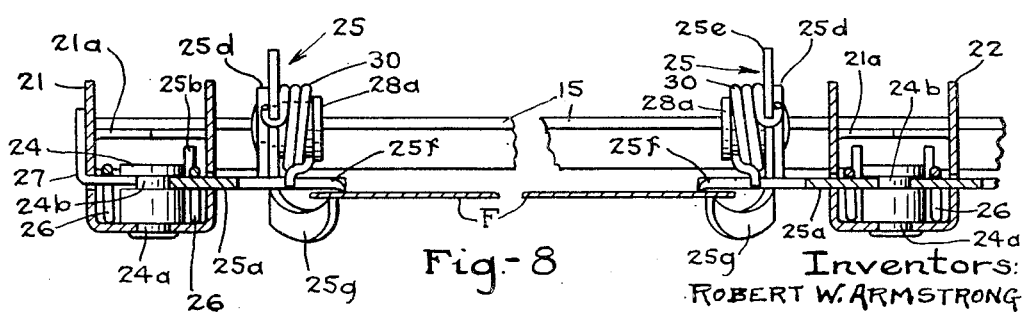
Inventors:
ROBERT W. ARMSTRONG
ROBERT SARDESON
EDWARD H. SAVELA
By Chas. C. Reif
Attorney.

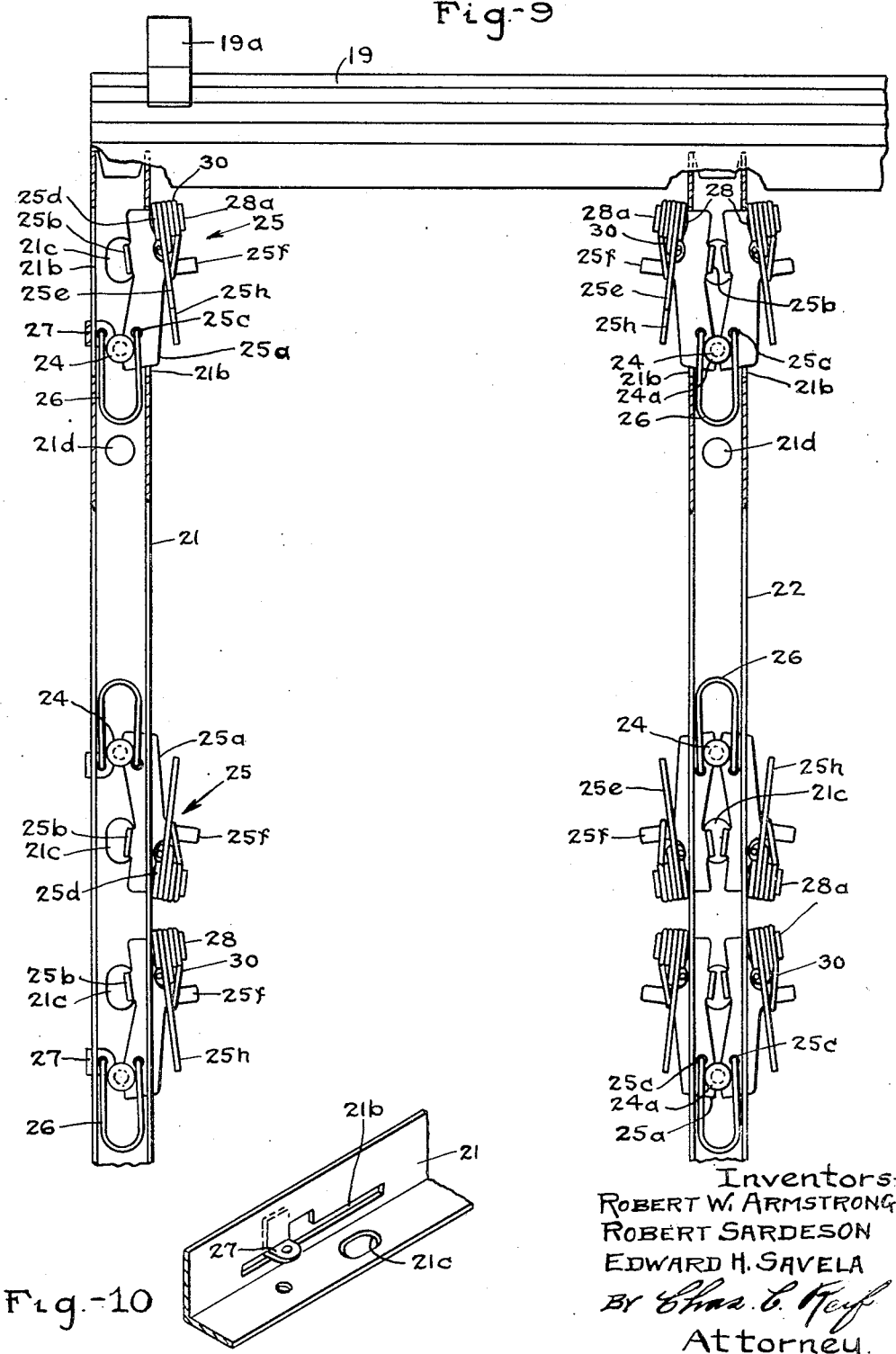
Feb. 14, 1950 — R. W. ARMSTRONG ET AL — 2,497,429
MULTIPLE FILM HANGER WITH FILM TENSIONING MEANS
Filed Sept. 15, 1945 — 4 Sheets-Sheet 4
Inventors
ROBERT W. ARMSTRONG
ROBERT SARDESON
EDWARD H. SAVELA
By Chas. C. Keyf
Attorney Patented Feb. 14, 1950

2,497,429

UNITED STATES PATENT OFFICE 2,497,429

MULTIPLE FILM HANGER WITH FILM TENSIONING MEANS

Robert W. Armstrong, Robert Sardeson, and Edward H. Savela, Minneapolis, Minn., assignors to Pako Corporation, Minneapolis, Minn., a corporation of Delaware Application September 15, 1945, Serial No. 616,596

15 Claims. (Cl. 95—100)

This invention relates to a film hanger for holding a plurality of comparatively small or cut photographic films. Photographic films of the cut type are now handled in immense numbers and it is desirable to have a hanger which will hold said films securely and will also preferably hold said films under tension so that they will be retained in flat condition or substantially in one plane. It is also desirable to have a hanger for holding such films which will not pierce or puncture said films. It is further desirable to have a hanger for holding a plurality of photographic films in which the films can be quickly and easily placed.

It is an object of this invention therefore to provide a film hanger for holding a plurality of comparatively small or cut photographic films and one in which the films can be very easily and quickly placed.

It is a further object of the invention to provide a film hanger for holding a plurality of comparatively small or cut photographic films which will securely hold the films in substantially flat position without piercing or puncturing the films.

It is still another object of the invention to provide such a hanger as set forth in the preceding paragraph in which the films will also be held under tension.

Another object of the invention is to provide a film hanger having spaced top and bottom members, a plurality of substantially parallel members extending between said top and bottom members and a plurality of gripping means carried on said last mentioned members and preferably arranged in transversely alined pairs adapted to engage the top and bottom portions of said films.

It is another object of the invention to provide a film holder for holding a plurality of comparatively small or cut photographic films, which hanger has a plurality of spaced longitudinally extending members, each of said members carrying a plurality of gripping means, said gripping means being arranged in transversely alined pairs and being swingable about axes disposed substantially at right angles to the plane of said hanger.

It is also an object of the invention to provide a film hanger for holding a plurality of comparatively small or cut photographic films comprising a plurality of substantially parallel members extending longitudinally of said hanger, each of said members having mounted thereon a plurality of spaced gripping means, each of said gripping means comprising a pair of jaws having gripping portions disposed in the spaces between said members, said gripping means each being mounted to swing about an axis extending at substantially right angles to the plane of said hanger.

It is more specifically an object of the invention to provide such a hanger as above set forth in which said members are in the form of channels having their open sides directed upwardly, said channels having pivot members therein about which said gripping members are swingable, one of the jaws of said gripping members extending through the side of said channel together with resilient means disposed in said channels for swinging said gripping means to normal position.

These and other objects and advantages of the invention will be fully set forth in the following description made in connection with the accompanying drawings in which like reference characters refer to similar parts throughout the several views and in which:

Fig. 1 is a plan view of the hanger;

Fig. 2 is a partial vertical section taken on line 2—2 of Fig. 1, as indicated by the arrows, certain parts being omitted;

Fig. 3 is a plan view of the hanger, certain parts being broken away;

Fig. 4 is a partial vertical section taken substantially on line 4—4 of Fig. 3, as indicated by the arrows;

Fig. 5 is a partial vertical section similar to Fig. 4 showing the parts in different position and a film in place;

Fig. 6 is a plan view of one of the gripping members used;

Fig. 7 is a partial plan view of the hanger shown on an enlarged scale;

Fig. 8 is a vertical section taken on line 8—8 of Fig. 7, as indicated by the arrows;

Fig. 9 is a partial plan view similar to Fig. 7 showing the parts in different positions; and Fig. 10 is a diagonal view of a portion of a channel used in the device.

Referring to the drawings, a film hanger is shown comprising a top member 15 and a bottom member 16 extending substantially parallel to said top member. As shown in Figs. 2 and 4, said top member 15 is provided with grooves and correspondingly formed ribs extending longitudinally thereof, said grooves and ribs being illustrated as substantially V-shaped. Top member 15 is provided adjacent its ends with slots 15a adapted to receive the bent end portions 17a of lugs 17b formed on supporting members 17 which extend upwardly and have cylindrical portions 17c through which extends a rod 18a forming part of a supporting frame 18. Lug 17a may be welded to one side of the portion 15 and the lower portions of member 17 at each side of lug 17b extend along the opposite sides of the upper edge portion of member 15 from lug 17a, as shown in Fig. 2. The rod 18a extends some distance beyond member 17 and is then bent upwardly at an angle and then bent upwardly to extend vertically, the same being secured to a top rod 18b. Top rod 18b extends some distance beyond the vertical portions of rod 18a and constitutes the supporting means for supporting the hanger in film processing machines. The bottom member 16 is also provided with ribs and grooves similar to top member 15 and is likewise provided with apertures 16a adjacent either side thereof. These apertures may receive hooked lugs 19a secured to the top of another hanger 19 so that two or more hangers will be supported from the frame 18.

Extending between members 15 and 16 substantially at right angles thereto are two side members 21 and two intermediate members 22. Members 21 and 22 are in the form of channels, said channels being illustrated as having their flanges forming substantially right angles with their webs respectively. Each of said members 21 and 22 have their channels cut away somewhat at their tops and bottoms and the respective flanges of the channels are bent towards each other to form the horizontal portions 21a. These portions 21a are secured to the lower portions 15c and to the upper portion 16c of top and bottom members 15 and 16 respectively, as shown in Figs. 2 and 4. Said portions 21a will be connected to said portions 15c in any suitable manner, as by welding. While either side of the hanger might be considered the upper side, for the purposes of this description the side shown uppermost in Fig. 1 will be considered the top or upper side of the hanger, and it will thus be seen that the members 21 and 22 have their open sides directed upwardly. Secured in the bottom of each of the channels 21 and 22 are spaced pivot members 24. These pivot members, as shown in Fig. 8, have reduced portions 24a extending through apertures in said bottoms of said channels and being riveted therein. Members 24 also have annular grooves 24b formed adjacent their upper ends. Each side member 21 has supported therein a plurality of spaced gripping means designated generally as 25 and each intermediate member 22 has supported therein a plurality of pairs of said gripping means 25. Each of said gripping means comprises a pair of gripping jaws, one of which is designated 25a. Jaw 25a has a flat platelike portion which extends through a slot 21b formed in the inner flanges of channels 21 and in both flanges of channels 22. Said portion 25a has a substantially semi-circular aperture formed therein and said portion 25a has one end part thereof disposed in the groove 24b with said semi-circular aperture fitting about the reduced portion of pivot member 24 within said groove. Each portion 25a can therefore swing about the axis of its respective pivot 24. Each portion 25a has an upstanding lug 25b disposed within the channels 21 and 22 and when the hanger is in empty normal position these upstanding portions or lugs 25b are disposed over oblong slots 21c formed through the webs of members 21 and 22. It may be here stated that an additional circular aperture 21d is formed through the webs of each of the members 21 and 22 adjacent the gripping means at one end thereof. Each portion 25a has a vertically extending aperture 25c extending therethrough adjacent pivot 24, through which extends the down-turned end of a bow spring 26 formed of spring wire. In the side members 21 the other downturned end of bow spring 26 extends through a vertically extending aperture in a small lug 27 having a portion secured to the outer side of channels 21 and having a horizontal portion extending into said channel through the slot 21b, as clearly shown in Figs. 9 and 10. The aperture receiving spring 26 is in the horizontal extending portion of lug 27 within the channel.

In the intermediate members 22 where the portions 25a of adjacent gripping means extend through slots 21b in both flanges of the channel, the down-turned ends of spring 26 extend through apertures 25c in both adjacent portions 25a. The ends of spring 26 after extending through apertures 25c are bent to extend parallel to the undersides of portions 25a. These terminal portions of spring 26 in the side members 21 which extend through lug 27 engage the inner side of the outer flange of said side members. The springs 26 have the planes of their bight portions extending parallel to the bottom of the channel. Said springs 26 act to hold the parts of portions 25a with upstanding lugs 25b in their inner positions, as shown in Fig. 9. Said portions 25a can be swung about pivot 24 to take the position shown in Fig. 7. This swinging movement is made against the tension or resistance of springs 26. At the outer side of each channel portion 25a has an upstanding lug 25d in which is riveted a pivot members 28. The other jaw of each gripping means, which will be designated generally 25e, is apertured to have pivot 28 extend therethrough and is thus swingable about pivot 28 and about the axis thereof. A coiled torsion spring 30 has its coiled portion disposed about pivot 28 outside of jaw 25e and one end of this spring has an end bent under the upper arm of jaw 25e, as shown in Figs. 4 and 5. The other end of spring 30 extends substantially horizontally and over the gripping portion 25f of portion 25a, which gripping portion is directed away from its channel and said end of said spring is bent downwardly slightly at one side of gripping portion 25f, as clearly shown in Fig. 5. Spring 30 is retained in place on pivot 28 by the head 28a formed at the outer side of said pivot. Spring 30 acts to normally hold jaw 25e in the position shown in Fig. 4. Jaw 25e has a gripping portion 25g formed slightly in the form of a hook so as to have a rather pointed end which normally engages the bottom of gripping portion 25f, as shown in Fig. 4. Jaw 25e is generally in the shape of a bell crank lever and its longer and upper arm has a portion 25h illustrated as of semi-circular form which is normally disposed above the top of its supporting channel, as shown in Fig. 4.

In the operation of the hanger as at present used, the hanger is placed upon a support which has spaced supporting surfaces for supporting the films F, as shown in Figs. 1 and 3, in spaced relation on suitable supports having less length or area than said films. Said support has members projecting upwardly therefrom which may be in the form of pins having tapered or sharpened upper ends. Said support also has an extra set of pins adapted to pass through the openings 21d. The pins passing through openings 21d locate the hanger accurately longitudinally on said support and the other pins mentioned pass upwardly through the openings 21c and have a diameter approximately the same as the width of said openings 21c so that the hanger is thus accurately positioned transversely. The hanger is thus positioned with the gripping means 25 arranged in pairs at each side of each film and adjacent each end thereof. When the hanger is placed on the said support, the said pins passing through openings 21c engage portions 25b and portions 25a are swung about pivots 24 so that said portions in said pairs of gripping means are swung toward each other and to a position shown in Figs. 1 and 3. Portions 25a and their gripping portions 25f are thus held in the position shown in Figs. 1, 3 and 7, against the tension of springs 26. A member is now moved toward the hanger from above and this has spaced portions which engage the portions 25h on the jaws 25e. Portions 25h are thus pushed downwardly and gripping portion 25g which was normally disposed above the projecting portion of its adjacent film F is now moved downwardly against said projecting edge portion and said projecting edge portion of the film is bent downwardly about the edge of its supporting surface until gripping portion 25g passes the edge of the film and the film then snaps back to the position shown in Fig. 5 so that it is disposed between gripping portions 25f and 25g. When the member engaging portion 25h is raised, spring 30 moves gripping portion 25g against the film and the edge and corner portion of the film is thus tightly gripped between gripping portions 25f and 25g. When the hanger is raised or lifted from said support and the pins engaging portions 25b leave the apertures 21c, the springs 26 swing the portions 25a of each gripping means away from each other in the respective pairs at each side of each film so that said films are thus placed under tension by springs 26. The films are thus not only securely held in the hanger but they are held under considerable tension. This insures that the films will be kept in flat condition or in one plane during the subsequent processing of the films, which usually includes developing, short stopping, washing and drying. The films are very securely held in the hanger and it will be noted that the films are not pierced or punctured. The hanger can be very quickly loaded with films, as set forth in applicants' copending application on the "Film loading apparatus," S. N. 616,597, filed September 15, 1945.

From the above description it will be seen that we have provided a novel, comparatively simple and very efficient structure of film hanger. By means of the novel construction, a plurality of comparatively small or cut films can be easily and quickly loaded into the hanger and the films are securely held in tensioned condition. The films are all simultaneously gripped in the loading operation. The parts of the gripping means are of simple construction and easily made. The springs 26 can be easily and quickly removed from portions 25a and said portions can then be quickly and easily removed through the slots 21b. It will be noted that slots 21b have an enlarged upper portion and the lug 25b can be withdrawn through this portion. It will also be noted that due to the normal angular position of the upper arms of jaws 25c relatively to the side of the channel that when portions 25h are depressed, the gripping portions 25g swing somewhat toward the side of the channel. This movement causes the gripping portion 25g to act more on the corner of the film and assists in the successful operation of the device.

The hanger can be easily and fairly inexpensively made from standard and easily procured material. Most of the parts can be made by punching and pressing operations. Such a hanger as described for holding a plurality of rows of cut films is believed to be entirely novel, especially such a hanger in which the gripping means are swingable about axes perpendicular to the plane of the films.

It will, of course, be understood that various changes may be made in the form, details, arrangement and proportions of the parts, without departing from the scope of applicants' invention, which generally stated, consists in an apparatus capable of carrying out the objects above set forth, in the parts and combinations of parts disclosed and defined in the appended claims.

What is claimed is:

1. A hanger for holding a plurality of films having in combination, substantially parallel spaced top and bottom members, a plurality of substantially parallel spaced side and intermediate members extending between said top and bottom members, said side and intermediate members being in the form of channels with their open sides directed upwardly, a plurality of spaced gripping means carried in said side and intermediate members, said gripping means each comprising a pair of gripping jaws disposed at the outer sides of said channels, a plurality of spaced pivot members being secured in the bottom of the channels forming said side and intermediate members, one of the jaws of each of said gripping means extending through the adjacent side of its channel respectively and being mounted for swinging movement about one of said pivots, said jaw carrying the other jaw, and resilient means disposed in said channel normally urging and moving said gripping means toward said channel.

2. A hanger for holding a plurality of photographic films having in combination, a plurality of spaced substantially parallel members extending longitudinally of said hanger, top and bottom members secured to said first mentioned members and extending transversely thereof, said first mentioned members being in the form of channels with their open sides directed upwardly, a plurality of spaced gripping means supported on each of said first mentioned members, each of said gripping means comprising a pair of gripping jaws, resilient means normally urging said jaws of each gripping means to and holding the same in closed position, said jaws of each gripping means having gripping portions disposed at the outer side of its supporting channel respectively, said channel having an opening in one side thereof, one of said jaws having a portion extending through said opening, a pivot secured in the bottom of said channel, said last mentioned portion being mounted for swinging movement about said pivot, and a spring disposed within said channel engaging said last mentioned portion for swinging the same and said gripping means about said pivot.

3. A hanger for holding a plurality of photographic films having in combination, a plurality of spaced substantially parallel members extending longitudinally of said hanger, top and bottom members secured to said first mentioned members and extending transversely thereof, said first mentioned members being in the form of channels with their open sides directed upwardly, a plurality of spaced gripping means supported on each of said first mentioned members, each of said gripping means comprising a pair of gripping jaws, pivot members secured in the bottom of each of said channels, each of said gripping means having one of its jaws projecting through the side of its supporting channel and mounted for swinging movement about one of said pivots, said jaw having a portion thereon adapted to be engaged for swinging said gripping member about said pivot.

4. The structure set forth in claim 3, said gripping jaw having a second pivot secured therein at the outer side of said channel and having a portion projecting at the outer side of said channel forming the gripping portion of said jaw, the other jaw of said gripping means being mounted for swinging movement about said second pivot and having a gripping portion engaging the underside of said first mentioned gripping portion, and resilient means urging said gripping portions into engaging relation.

5. A hanger for supporting a plurality of films, said hanger comprising a frame having end members and a plurality of longitudinally extending substantially parallel members secured to said end members, said last mentioned members having flanges disposed substantially at right angles to each other, a plurality of spaced pivot members secured in one of said flanges respectively, gripping means each having a gripping jaw extending through the other of said flanges and mounted for swinging movement about said pivots respectively resilient means for swinging said gripping means about said pivot members respectively, said jaw having a gripping portion projecting at the outer side of said latter flange and having another portion at the outer side of said latter flange, a second pivot secured in said last mentioned portion, the other jaw of said gripping means being mounted on said second pivot and having a gripping portion adapted to engage the bottom side of said first mentioned gripping portion, a spring disposed about said second pivot and engaging said jaws respectively for moving said gripping portions to engaging position.

6. The structure set forth in claim 5, said resilient means comprising a bow spring disposed at one side of said latter flange having one end disposed in said first mentioned jaw and having its other end anchored in said longitudinally extending member.

7. The structure set forth in claim 5, said first mentioned jaw having an operating lug extending upwardly substantially parallel to said other of said flanges for swinging said jaw about said first mentioned pivot.

8. The structure set forth in claim 5, said other jaw having an arm extending away from said second pivot for swinging said other jaw about said pivot to move said other jaw away from said first mentioned jaw.

9. A hanger for supporting a plurality of films comprising a frame having top and bottom members, substantially parallel side members extending between and secured to said top and bottom members, a plurality of substantially parallel members extending between said top and bottom members and secured thereto, said members being in the form of channels having their open sides directed upwardly, a plurality of pairs of gripping means supported by said members, a pivot member for each of said pairs secured in the bottom of its supporting channel, said gripping means comprising a pair of gripping jaws, one of the jaws of each of said pairs extending through the side of said channel and being mounted for swinging movement about said pivot, said jaw having a gripping portion projecting at the outer sides of said channel, a second gripping jaw carried by said jaw and having a gripping portion engaging said first mentioned gripping portion, and resilient means holding said gripping portions in engaging relation.

10. The structure set forth in claim 9, each of said first mentioned jaws having a portion disposed at the outer side of said channel, a second pivot mounted in said last mentioned portion, said second jaw being mounted for swinging movement about said second pivot.

11. The structure set forth in claim 9, the portion of each of said first mentioned jaws of each pair disposed in said channel having upstanding lugs substantially parallel to the sides of said channel, said lugs being pressed apart in the operation of said hanger for swinging said jaws about said first mentioned pivot member.

12. The structure set forth in claim 9, a portion of each of said jaws disposed within said channel having apertures extending vertically therethrough, a bow spring having its ends bent downwardly and disposed in said apertures, the plane of said spring being substantially parallel to the bottom of said channel, said spring acting to move said jaws and said gripping means toward each other.

13. A hanger for holding a plurality of photographic films having in combination, a rigid rectangular frame comprising top and bottom members and parallel side members, a plurality of spaced intermediate members extending from said top and bottom members parallel to said side members and forming between each other and said side members a plurality of spaces, a plurality of gripping means carried by and spaced longitudinally of said side and intermediate members and aligned transversely of said frame, there being two of said gripping means disposed side by side on said intermediate members, whereby all of said gripping means are disposed at the corners of rectangles in said spaces, each of said gripping means being individually pivoted to swing about an axis extending substantially perpendicular to said frame and closely adjacent said gripping means, said gripping means each comprising a pair of pivoted spring-pressed jaws, the pivots of all of said jaws being arranged in parallel relation.

14. The structure set forth in claim 13, and resilient means arranged to swing said gripping means about said axes respectively for urging and normally holding the gripping means at the ends of said rectangles in positions remote from each other.

15. The structure set forth in claim 13, one of the jaws of each of said gripping means having an upstanding flat lug thereon rigid therewith which is moved laterally in the operation to swing said jaw.

ROBERT W. ARMSTRONG.
ROBERT SARDESON.
EDWARD H. SAVELA.

REFERENCES CITED

The following references are of record in the file of this patent:

UNITED STATES PATENTS

| Number | Name | Date |
|---|---|---|
| 1,113,288 | Barnes et al. | Oct. 13, 1914 |
| 1,237,563 | Schoenberg | Aug. 21, 1917 |
| 1,666,895 | Gollomb | Apr. 24, 1928 |
| 1,778,140 | Becker | Oct. 14, 1930 |
| 1,825,310 | Engstrom | Sept. 29, 1931 |
| 1,854,931 | Gollomb | Apr. 19, 1932 |
| 2,078,078 | Hood | Apr. 20, 1937 |
| 2,180,010 | Martin | Nov. 14, 1939 |
| 2,290,831 | Fink | July 21, 1942 |

FOREIGN PATENTS

| Number | Country | Date |
|---|---|---|
| 207,952 | Great Britain | Dec. 13, 1923 |
| 568,057 | Germany | Jan. 13, 1933 |